United States Patent [19]

Janssen

[11] 4,345,396
[45] Aug. 24, 1982

[54] VISIBLE INDEXES

[76] Inventor: Alexander P. Janssen, c/o Datastrip Corporation, 1575 Avon St. Extended, Charlottesville, Va. 22901

[21] Appl. No.: 212,625

[22] Filed: Dec. 3, 1980

[51] Int. Cl.³ .............................................. G09F 3/04
[52] U.S. Cl. ...................... 40/490; 40/611; 428/99; 428/132; 283/36; 283/39
[58] Field of Search ................ 428/132, 99; 40/373, 40/374, 395, 377, 403, 383, 389, 489, 490, 491, 611, 16, 16.4; 24/73 B, 81 B, 155 BR, 205.14 A, 201 TR; 283/39, 37, 41, 36

[56] References Cited

U.S. PATENT DOCUMENTS

| | | | |
|---|---|---|---|
| 1,340,140 | 5/1920 | Anthony | 40/395 |
| 1,447,889 | 3/1923 | Reuschlein | 40/374 |
| 1,809,066 | 2/1930 | Powell | 40/374 |
| 2,552,270 | 5/1951 | Evans | 40/374 X |

Primary Examiner—George F. Lesmes
Assistant Examiner—Alexander S. Thomas
Attorney, Agent, or Firm—Le Blanc, Nolan, Shur & Nies

[57] ABSTRACT

Spring loaded devices for spacing index strips and other components of a visible index with respect to a frame supporting those components and for removably attaching items to or holding them against the frame.

5 Claims, 7 Drawing Figures

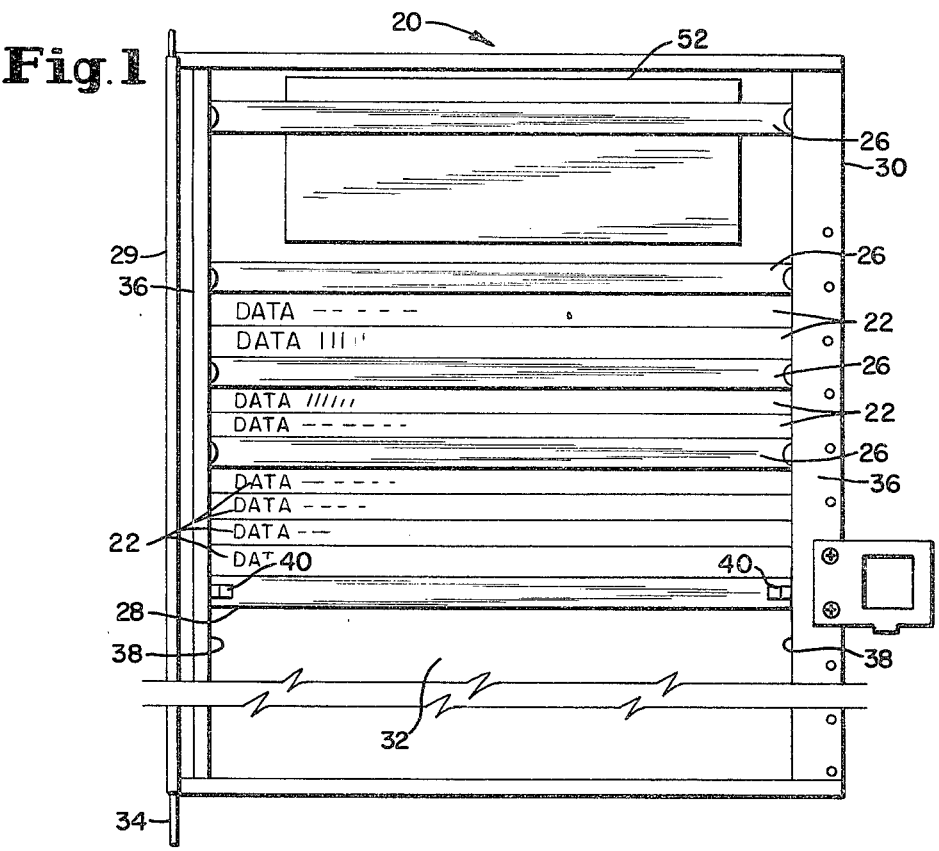
Fig. 1
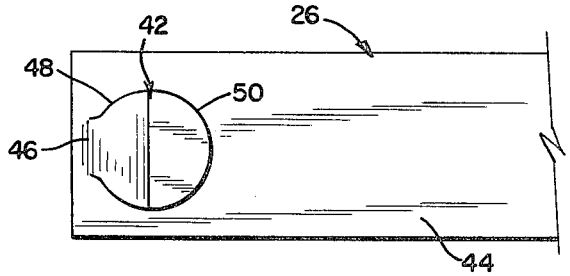
Fig. 2
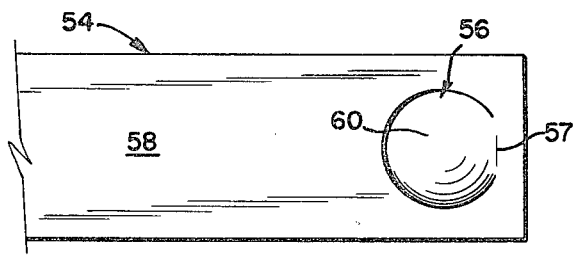
Fig. 4
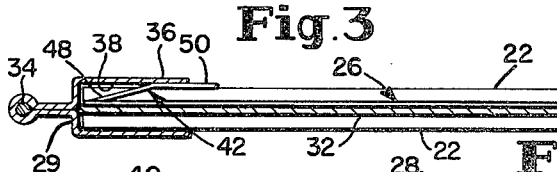
Fig. 3
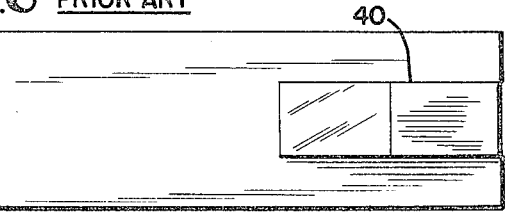
Fig. 5
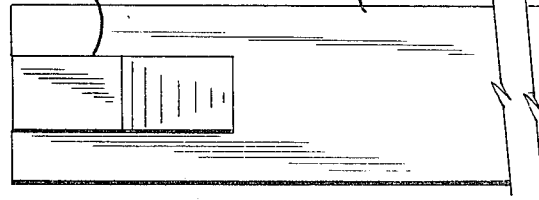
Fig. 6 PRIOR ART
Fig. 7 PRIOR ART

VISIBLE INDEXES

This invention relates to the display of information and, more particularly, to novel, improved information display systems of the visible index type.

Visible indexes have seen widespread use for many years. Such indexes typically include a stand to which a number of frames or supports can be attached. These frames consist of a strip supporting panel extending between side members having recesses into which the ends of narrow, elongated, flexible index strips bearing the wanted information can be fitted to detachably secure the strips in place.

The index strips can consequently be readily removed and replaced or relocated, making it relatively easy to keep the index current. At the same time the information is available in a highly accessible form.

Another type of component commonly found in visible indexes of the type just described is a spring loaded device for spacing index strips—or groups of index strips—along the frames of those indexes. And, in a further aspect, my invention relates to devices of that character.

Heretofore available devices of the type just described have split ends with prongs that must be depressed to fit the ends of the spacers in the channels of the associated frames. This has the disadvantage of requiring considerable manual dexterity. Also, the prongs are apt to scratch the panel which is also obviously undesirable.

I have now invented novel, improved index strip spacing devices which are free of the foregoing disadvantages. Generally speaking, they differ from the other currently available devices by virtue of the mechanism used to retain the ends of the spacers in the channels of the frames with which they are employed. Instead of the conventional prongs I provide for this purpose resiliently biasable tabs or flaps which are struck out of the strips and are integral with the strips at their outer ends. In addition to facilitating the installation of the spacers, this construction also results in there being relatively large areas of contact between the ends of the spacers and the channels in which they are installed. This generates sufficient friction to keep the spacer solidly in position.

The tabs may have a dished out configuration that furnishes a convex surface for contacting the channels in which the ends of the spacers are fitted. At the expense of reduced contact between the spacer ends and the frame channels, this avoids the damage to the frames which the sharp edges of the prongs of the previously available spacers were apt to cause.

Another attribute of my novel spring spacers is that they are biased with significant force against the panels of the frames in which they are installed. Consequently, those devices can also be readily utilized to detachably clamp or fix thin items of paper or other materials to the frame equipped with such a spacer. Alternatively, other arrangements can be employed to secure an item of the character just described to the frame with one or more spring spacers being used to hold it flat against the panel of the frame.

From the foregoing it will be apparent to the reader that one important and primary object of my invention resides in the provision of novel, improved visible indexes.

An equally important and primary object of my invention resides in the provision of novel, improved devices for spacing the information bearing strips of visible indexes and for detachably fixing items to, or holding them against the panels of, frames with which the spacers are associated.

A related and also important object of my invention is the provision of such devices which are easier to install correctly in the frames with which they are employed than heretofore available spacers.

Another, related and important object of my invention resides in the provision of such devices which are so constructed that they remain securely in the wanted locations along the frames with which they are associated.

Yet another, also related object of my invention is the provision of devices as aforesaid which are less apt to damage the frames with which they are associated than heretofore available spring spacers.

Yet another important, but more specific, object of my invention is the provision of devices for spacing the strips of visible indexes and for detachably fixing items to, or holding them against the panels of, frames with which the spacers are associated which comprise elongated strips of elastically deformable material and integral, resiliently biasable tabs for retaining the latter in the channels of a strip supporting frame with which they are associated.

Other important objects and features and additional objects of my invention will become apparent from the appended claims and as the ensuing detailed description and discussion proceeds in conjunction with the accompanying drawing, in which:

FIG. 1 is a plan view of a visible index including a frame, index strips maintained in wanted locations along the frame by spring spacers embodying and constructed in accord with the principles of the present invention and by a prior art spacer, and a cardlike component held against the panel of the frame by a spring spacer embodying the principles of my invention;

FIG. 2 is a partial plan view of a spring spacer embodying the principles of the present invention;

FIG. 3 is an edge view of the spring spacer of FIG. 2 and a fragment of a panel with which the spacer is associated;

FIGS. 4 and 5 are views corresponding generally to FIGS. 2 and 3 of a second form of spring spacer; and FIGS. 6 and 7 are similar views of a prior art visible index spacer.

Referring now to the drawing, FIG. 1 depicts one frame 20 of a visible index system of the type in which spacers embodying, and constructed in accord with, the principles of the present invention are intended to be employed.

Supported from frame 20 are visible index strips 22 on which wanted information is intended to be displayed. These strips are spaced at selected locations along frame 20 by spacers 26 embodying the principles of my invention and by a prior art spacer 28.

The illustrated frame 20 is of the simplified and rugged construction disclosed in my copending application Ser. No. 98,836 filed Nov. 30, 1979. It consists of channel defining side members 29 and 30 attached to a flat, index strip supporting panel 32 typically made of metal or plastic. A pin 34, extending through side member 29 and protruding from its upper and lower ends (or separate pins seated in these ends), is typically provided to support the frame from a stand such as shown in U.S.

Pat. No. 1,809,066 issued June 9, 1931, to Powell and U.S. Pat. No. 2,552,270 issued May 8, 1951, to Evans or from any one of the other heretofore proposed frame holders.

Each of the side members 29 and 30 of support 20 has a flange 36 which co-operates with panel 32 to form a channel or recess 38. The ends of index strips 22 are fitted in these recesses to secure the index strips to the frame.

Index strips 22 may be of any of the several available types—for example, of the novel improved construction described in application Ser. No. 98,836. The latter are supplied as an assemblage which includes a plurality of index strips bonded to a backing sheet by a releasable adhesive; i.e., one which forms with the backing sheet and the index strips a bond stronger than the adhesive itself. As a consequence, the adhesive rather than one of the foregoing bonds will rupture internally when an index strip is detached from the backing sheet.

The index strips themselves are of the three-ply construction. In one exemplary index strip of this type, the top ply is 0.0085 inch thick Riegel Jersey Plate Bristol. The central ply is 0.014 inch thick International Paper Company Luxcell resin impregnated paper; and the third, bottom ply is 0.007 inch thick Riegel Jute Tag Paper.

Luxcell papers, described in detail in U.S. Pat. No. 3,769,143 issued Oct. 30, 1973, to Kulesza, are composed of a fibrous mat impregnated with a partially cured, resin-modified, cross-linked, urea-formaldehyde resin. The modifier resin is a polymerized, ethylenically unsaturated monomer annd contains chain-pendant methylol groups. The urea-formaldehyde contains ca. 1.3 to 2.2 mols of formaldehyde per mol of urea, and the paper contains ca. 25 to 75 percent by weight of the modified urea-formaldehyde resin.

These papers have properties which, for my purposes, surpass those of wood veneers and other papers; and they do not have certain disadvantages appurtenant to these materials. For example, they are free of knotholes and irregular grains.

The backing sheet for the exemplary index strip assemblage just described is an 0.007 inch thick tabulating card stock marketed by International Paper Company.

Referring still to FIG. 1, it is often desirable to separate the index strips 22 supported from a particular frame 20 into distinct groups and/or to otherwise space particular strips at specific locations along the frame. FIG. 1 shows how the spacers 26 I have invented and a prior art spacer 28 are employed for that purpose.

As shown in FIGS. 4 and 5, the latter, prior art spacer 28 is an elongated strip of a flexible, resiliently deformable material such as a mild steel, for example.

The prior art spacer 28 is secured to frame 20 by depressing the outwardly extending prong 40 at one end of the strip so that that end can be fitted into one of the two recesses or channels 38 of support 20, bowing the spacer away from the panel 32 of the support, and depressing the prong 40 at the other end of the strips so that that end can be fitted in the other recess 38 of the frame. Considerable dexterity is required to accomplish this. Furthermore, the sharp edges of the prongs 40 tend to scrape along the side members 29 and 30 of the frame unless considerable care is exercised. This results in the paint or other finish being scraped from the side members which is undesirable for self-evident reasons.

The novel index strip spacers 26 disclosed herein differ from those just described primarily in the mechanism employed for securing the ends of the spacer in the channels 38 formed by the side members 29 and 30 of frame 20. As best shown in FIGS. 2 and 3, this consists of tabs or flaps 42 struck out of the strip 44 from which the spacer is formed. These tabs are integral with the spacer forming strip at the outer ends 46 of the strip and the tabs.

As best shown in FIG. 3, each tab 42 has one segment 48 extending inwardly from the outer end of the tab at an acute angle to the spacer forming strip and a second, integral segment 50 extending inwardly therefrom parallel to the spacer forming strip 44. This provides relatively large areas of contact between the tabs 42 and the side members 29 and 30 of the frames 20 in which the spacers are installed and against which the tabs of the spacers are resiliently biased. The result is the generation of sufficient friction to retain the spacers firmly in the locations along the frame in which they are wanted.

A spacer 26 is fixed to support 20 simply by fitting an end of the spacer into one of the recesses 38 between a side member 29 or 30 and the panel 32 of support 20, bowing the spacer so that the opposite end can be inserted into the other recess 38, and pressing the spacer toward panel 32. This securely seats both ends of spacer 26 in place with the main part of the spacer flat against panel 32 and with the inner segments 50 of tabs 42 biased against side members 29 and 30 to locate the spacer at the wanted position along the frame.

As discussed above, spring spacers embodying the principles of the present invention can also be employed to detachably fix to frames of the type with which they are employed—or to hold flat against the panels of such frames—items or other materials which are relatively thin, at least in part. FIG. 1, as an example, shows a card 52 thus detachably but securely held against the panel 32 of frame 20 by a spacer 26 of the character described above. Items such as card 52 can be attached to the frame simply by sliding them between the panel of the frame and the spacer by which they are held in place.

Referring again to the drawing, FIGS. 4 and 5 illustrate a spring spacer 54 which differs from that described above in that its tabs 56, again inclined at angle from their outer ends (57) relative to the main part 58 of the spacer, have a generally dished configuration. This generates convex surfaces 60 for engaging the side members 29 and 30 of the frame.

The dished configuration of tabs 56 keeps sharp edges out of contact with the channels, thereby keeping the side members from being marred or otherwise disfigured as the spacer is inserted (or removed) or as it may be slid along the support to the location where it is wanted. However, this does reduce the area of contact between the tabs and the side members of the associated frames; and spacers 54 are, accordingly, not as apt as spacers 26 to remain where they are wanted.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by Letters Patent is:

1. A visible index comprising a frame and a spring spacer for positioning an index strip or other component in a selected location along said frame or for detachably holding an item against said frame, said frame comprising a flat, sheetlike support and means at opposite edges of said support forming channels into which ends of said spacer can be fitted and said spacer comprising an elongated integral strip of elastically deformable material having integral means at the opposite ends of said strip for retaining those ends in said channels, said retaining means being resiliently biasable tab-like portions struck out of said strip, those ends of the struck out portions nearest the ends of said strip being spaced inwardly from the outer ends of said strip and being integral with said strip, and said struck out portions having segments thereof engageable with the means defining said channels, each segment being shaped at its periphery so as to avoid marring of or damage to said frame during insertion therewithin or withdrawal therefrom.

2. A visible index as defined in claim 1 wherein each resiliently biasable portion struck out of said strip has an outer segment extending inwardly of the strip at an acute angle thereto and a second, inner segment which is thereby spaced from said strip and is engageable with the means defining the channels of the frame.

3. A visible index as defined in claim 1 wherein the resiliently biasable, struck out portions at the opposite ends of said elongated strip have convex surfaces in contact with the channel forming means into which the ends of the strip are fitted.

4. A visible index as defined in any of the preceding claims 1-3 which includes an index strip supported by said frame and positioned therealong by a spacer as aforesaid, said index strip spanning said frame and the ends thereof being fitted in said channels to thereby secure the index strip to the frame.

5. A visible index as defined in any of the preceding claims 1-3 which includes a component of thin cross-section disposed between a spacer as aforesaid and the sheetlike support of the frame and thereby held against said support by said spacer.

* * * * *